US011996641B2

(12) United States Patent
Berger et al.

(10) Patent No.: US 11,996,641 B2
(45) Date of Patent: May 28, 2024

(54) ELECTRICAL HIGH-VOLTAGE CIRCUIT BOARD PLUG CONTACT DEVICE AND POWER-ELECTRIC CIRCUIT BOARD CONNECTION

(71) Applicant: TE Connectivity Germany GmbH, Bensheim (DE)

(72) Inventors: Karl Marc-Andreas Berger, Bensheim (DE); Eike Luellich, Bensheim (DE); Dirk Duenkel, Bensheim (DE); Steffen Reichel, Bensheim (DE); Juri Fionik, Bensheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 51 days.

(21) Appl. No.: 17/841,051

(22) Filed: Jun. 15, 2022

(65) Prior Publication Data

US 2022/0407252 A1 Dec. 22, 2022

(30) Foreign Application Priority Data

Jun. 16, 2021 (DE) .......................... 10202111558.5

(51) Int. Cl.
*H01R 12/70* (2011.01)
*H01R 12/71* (2011.01)
(Continued)

(52) U.S. Cl.
CPC ....... *H01R 12/7023* (2013.01); *H01R 12/718* (2013.01); *H01R 12/91* (2013.01); *H01R 13/113* (2013.01)

(58) Field of Classification Search
CPC .. H01R 12/7023; H01R 12/718; H01R 13/41; H01R 12/585; H01R 12/91;
(Continued)

(56) References Cited

U.S. PATENT DOCUMENTS 5,597,332 A * 1/1997 Walbrecht ............. H01R 12/58 439/850
6,319,075 B1 11/2001 Clark et al.
(Continued)

FOREIGN PATENT DOCUMENTS

DE 102014108001 A1 * 12/2015 ............. H01R 12/53
DE 102018122532 A1 3/2020
(Continued)

OTHER PUBLICATIONS

Extended European Search Report dated Nov. 8, 2022, corresponding to Application No. 22178964.7-1201, 9 pages.
(Continued)

*Primary Examiner* — Travis S Chambers
(74) *Attorney, Agent, or Firm* — Barley Snyder

(57) ABSTRACT

An electrical circuit board plug contact device includes an electrical circuit board contact element and an electrical plug contact element formed separately from the electrical circuit board contact element. The electrical plug contact element is laterally offset with respect to the electrical circuit board contact element and an electrically conductive connection is provided between the electrical circuit board contact element and the electrical plug contact element.

20 Claims, 4 Drawing Sheets

(5)

(0)

(51) Int. Cl.
*H01R 12/91* (2011.01)
*H01R 13/11* (2006.01)

(58) Field of Classification Search
CPC .............. H01R 13/113; H01R 12/7052; H01R 12/7088; H01R 12/57; H01R 13/502; H01R 12/71; H01R 13/639; H01R 2201/26
See application file for complete search history.

(56) References Cited

U.S. PATENT DOCUMENTS

| | | | |
|---|---|---|---|
| 6,554,646 B1 | 4/2003 | Casey | |
| 7,494,389 B1 | 2/2009 | Essert et al. | |
| 2007/0232096 A1 | 10/2007 | Schmid et al. | |
| 2017/0179626 A1* | 6/2017 | Hori | H01R 13/44 |

FOREIGN PATENT DOCUMENTS

| | | | |
|---|---|---|---|
| DE | 102018217505 | B3 | 3/2020 |
| DE | 102019115773 | A1 | 12/2020 |
| DE | 102019208195 | A1 | 12/2020 |
| DE | 102021111433 | A1 | 11/2021 |
| FR | 2938382 | A1 | 5/2010 |
| JP | H11329532 | A | 11/1999 |
| JP | 2000188152 | A | 7/2000 |
| JP | 2007533069 | W | 11/2007 |
| JP | 2013541822 | A | 11/2013 |
| JP | 2019129054 | A | 8/2019 |
| WO | 2005101933 | A1 | 10/2005 |
| WO | 2012058807 | A1 | 5/2012 |
| WO | 2014172250 | A1 | 10/2014 |
| WO | 2019099829 | A1 | 5/2019 |

OTHER PUBLICATIONS

German Office Action, Application No. 102021115583.5, Dated: Apr. 7, 2022, 7 pages.

Japanese Office Action dated Nov. 28, 2023 with English translation, corresponding to Application No. 2022-094883, 8 pages.

* cited by examiner

ELECTRICAL HIGH-VOLTAGE CIRCUIT BOARD PLUG CONTACT DEVICE AND POWER-ELECTRIC CIRCUIT BOARD CONNECTION

CROSS-REFERENCE TO RELATED APPLICATIONS

This application claims the benefit of the filing date under 35 U.S.C. § 119(a)-(d) of German Patent Application No. 102021115583.5, filed on Jun. 16, 2021.

FIELD OF THE INVENTION

The invention relates to a plug contact device and, more particularly, to an electrical high-voltage circuit board plug contact device.

BACKGROUND

In the electrical sector (electronics, electrical engineering, electrics, electric energy technology, etc.), a large number of electric connector elements or connector devices, socket, pin and/or hybrid connectors etc. are known—referred to below as (electrical) connectors (also: mating connectors)—that serve to transmit electrical currents, voltages, signals and/or data with a wide range of currents, voltages, frequencies and/or data rates. In the area of low, medium or high voltages and/or currents, and in particular in the vehicle sector, such connectors have to ensure transmission of electrical power, signals and/or data permanently, repeatedly and/or for a short time after a comparatively long period of inactivity in mechanically stressed, warm, possibly hot, contaminated, damp and/or chemically aggressive environments. Owing to a wide range of applications, a large number of specially designed connectors are known.

Such a connector and, if applicable, its associated (e.g. in the case of a connector element or a connector device) or higher-level housing (e.g. in the case of a connector device) can be fitted to an electrical line, a cable, a cable harness etc.—referred to below as an assembled (electrical) cable (also: electrical entity)—or to/in an electrical device or element, such as e.g. to/in a housing, to/on a leadframe, to/on a circuit board etc., of a (power-) electrical, electro-optical or electronic component or a corresponding aggregation etc. (electrical entity).

If a connector (with/without a housing) is located on a cable, a line or a cable harness, this is also called a flying (plug) connector or a plug, a socket or a coupling; if it is located on/in an electrical, electro-optical or electronic component, aggregation etc., this is also called a connector device, such as e.g. a (built-in/mounted) connector, a (built-in/mounted) plug or a (built-in/mounted) socket. A connector on such a device is further often also referred to as a (plug) receptacle, pin header, pin strip or header. In the context of electrical power engineering (generating, converting, storing and transporting high-voltage electrical current in electricity grids, preferably with three-phase high-voltage transmission), reference is made here to cable fittings because of their comparatively complex structure.

Such a connector must ensure proper transmission of electricity, wherein mutually corresponding and partially complementary connectors (connector and mating connector) usually have locking devices and/or fastening devices for permanent but generally releasable locking and/or fastening of the connector to/in the mating connector or vice versa. An electrical connecting device for a connector, e.g. comprising or at least having: an actual contact element (usually formed materially in one piece or integrally, e.g. a (crimp) contact element etc.; can also be referred to as a terminal) or a contact device (usually formed in one piece and from several or two parts, or materially in one piece, e.g. a (crimp) contact device; can also be referred to as a terminal), further has to be held securely therein.

Efforts are continually being made to improve electrical connectors and their terminals, in particular to design them more effectively and to make and/or produce them at lower cost. In the case of vehicles—motor vehicles (rail vehicles) with/without an electric traction motor, rail vehicles, watercraft, aircraft—stringent safety requirements must be met for high-voltage and/or high-current connectors, for example for the auxiliary assemblies of said vehicles. These safety requirements relate to clearance and creepage distances, vibration requirements etc., depending on the application. The object of the invention is to specify an electrical circuit board plug contact device which can meet the stringent requirements for clearance and creepage distances and possibly vibrations.

The prior art is shown in FIG. 1 in which a power-electric circuit board connection 2 with two electrical high-voltage circuit board socket contact elements 90 according to the prior art is illustrated. In the figure, the arrows indicate the clearance and creepage distances, with the clearance distance (dashed arrow) being substantially identical to the creepage distance (solid arrow) in the prior art. In particular, short creepage distances in comparison to the clearance distances are problematic in high-voltage applications. The creepage distances should always be longer than the clearance distances as far as possible.

SUMMARY

An electrical circuit board plug contact device includes an electrical circuit board contact element and an electrical plug contact element formed separately from the electrical circuit board contact element. The electrical plug contact element is laterally offset with respect to the electrical circuit board contact element and an electrically conductive connection is provided between the electrical circuit board contact element and the electrical plug contact element.

BRIEF DESCRIPTION OF THE DRAWINGS

The invention will now be described by way of example with reference to the accompanying Figures, of which.

DETAILED DESCRIPTION OF THE EMBODIMENT(S)

Figure 2:
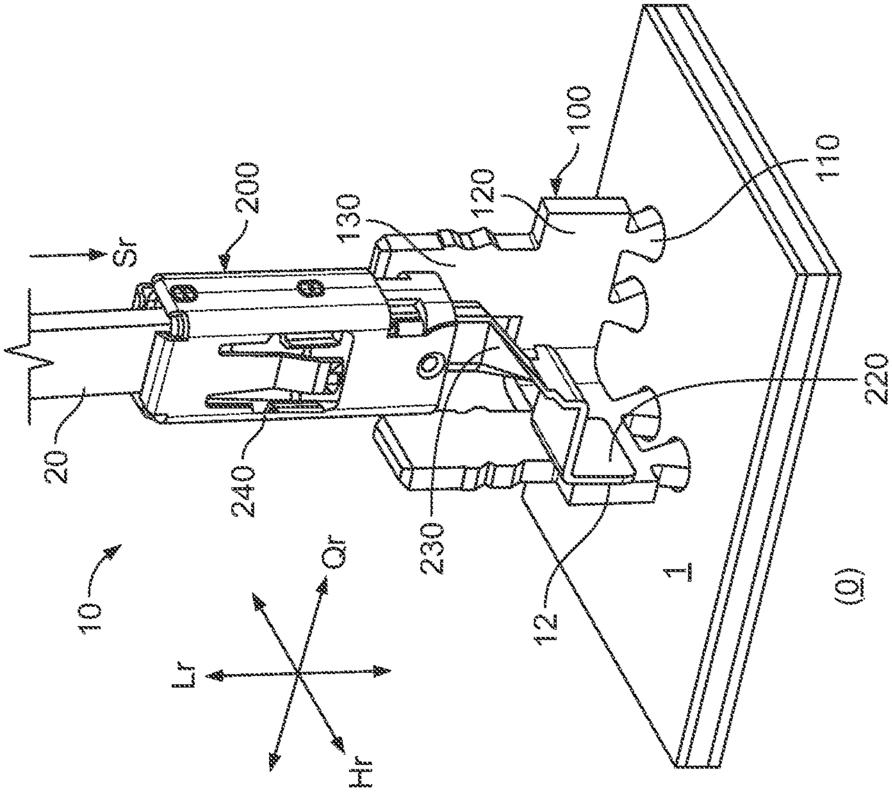
FIG. 2 is a perspective view of a circuit board or substrate plug contact device according to the invention for a circuit board or a substrate.
Figure 1:
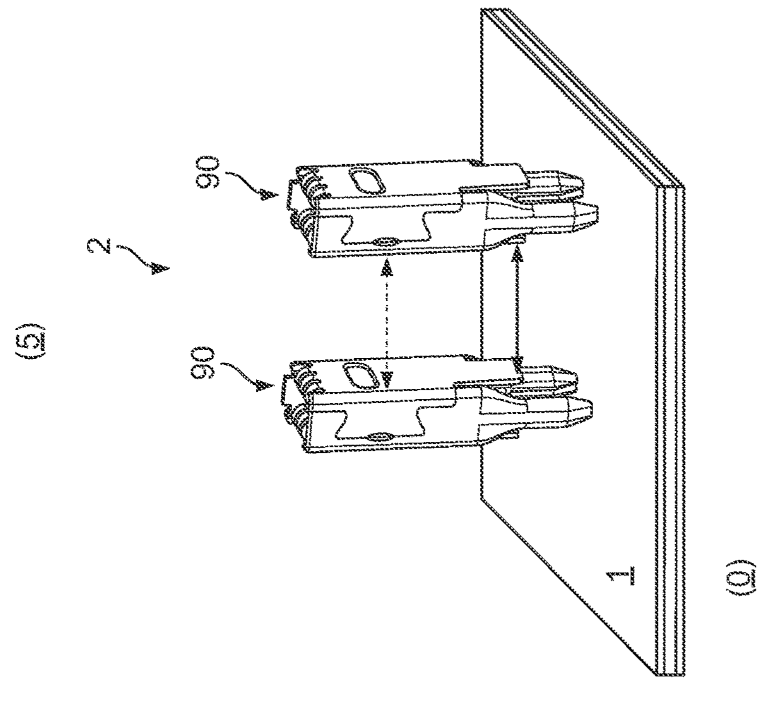
Fig. 1 (Prior Art)
FIG. 1 is a perspective view of two prior-art circuit board contact element for a power-electric connection according to the prior art for an electrical entity.

The invention is explained in greater detail below on the basis of exemplary embodiments with reference to the appended drawings, which are diagrammatic and not to scale. Portions, elements, component parts, units, components and/or patterns which have an identical, unique or analogous configuration and/or function are identified by the same reference. A possible alternative which is not explained, is not shown in the drawing, and/or is not definitive, a static and/or kinematic reversal, a combination etc. with respect to the exemplary embodiments of the invention or a component, a pattern, a unit, a component part, an element or a portion thereof, can further be gathered from the description of the figures.

In the case of the invention, a feature (portion, element, component part, unit, component, function, variable etc.) can be of positive configuration, that is to say present, or of negative configuration, that is to say absent. In this specification, a negative feature is not explained explicitly as a feature if value is not placed on it being absent according to the invention; that is to say, the invention which is actually made and is not constructed by way of the prior art consists in omitting the said feature.

A feature of this specification can be used not only in a specified manner and/or way, but rather also in another manner and/or way (isolation, combination, replacement, addition, on its own, omission, etc.). It is possible, in particular, to replace, add or omit a feature in the patent claims and/or the description on the basis of a reference sign and a feature which is assigned to it, or vice versa.

The features of the description can also be interpreted as optional features; that is to say, each feature can be considered to be an optional or arbitrary feature, that is to say a feature which is not mandatory. Therefore, a separation of a feature, possibly including its periphery, from an exemplary embodiment is possible, it then being possible for the said feature to be transferred to a generalized inventive concept. The absence of a feature (negative feature) in an exemplary embodiment shows that the feature is optional in relation to the invention. Furthermore, in the case of a type term for a feature, a generic term for the feature can also be implicitly understood (possibly further hierarchical breakdown into subgenus, etc.), as a result of which a generalization of the feature is possible, for example with consideration of equivalent effect and/or equivalence.

The invention is explained in more detail below on the basis of exemplary embodiments of one embodiment (FIGS. 2 to 7) of a variant of an electrical high-voltage circuit board or high-voltage substrate plug contact device 10 (below merely: circuit board plug contact device 10) for an electrical circuit board 1 or an electrical substrate 1 of an electrical entity 0, and two embodiments of a power-electric circuit board connection 2 of the entity 0.

The term 'high-voltage' is intended to mean that the circuit board plug contact device 10 is designed for at least 60 V, i.e. for voltages starting from which there is danger to life and limb, possibly depending on the application. The entity 0 may be in the form of a populated circuit board 0 or an auxiliary assembly 0, e.g. of a vehicle with an internal combustion engine or an electric traction motor, such as e.g. in the form of an air-conditioning compressor 0, a heating module 0 etc.

Although the invention is described and illustrated further in greater detail by way of exemplary embodiments, the invention is not restricted by way of the disclosed exemplary embodiments, but rather is of more fundamental nature.

Other variations can be derived therefrom without departing from the scope of protection of the invention. The invention can be used in general in the electrical sector in the case of an electrical entity. One exception is formed here by terrestrial electrical power engineering. The drawings show only those spatial portions of the subject matter of the invention which are necessary for understanding of the invention. Designations such as connector and mating connector, terminal and mating terminal etc. are to be interpreted synonymously, that is to say may be mutually interchangeable. The explanation of the invention on the basis of the drawings refers below to a longitudinal direction Lr (one selection thereof is the plug-connection direction Sr), a transverse direction Qr, and a vertical direction Hr of the circuit board plug contact device 10 according to the invention.

The electrical high-voltage mating contact element 20 (that is to say also high-current mating contact element 20, below merely: mating contact element 20), e.g. tab contact element 20 (cf. FIG. 2), of various electrical connectors 5, such as e.g. of pin strips 5 or headers 5, with different spacings and different orientations establishes internal electrical connection with the circuit boards 1 of the entities 0 while simultaneously increasing creepage distances on the circuit boards 1.

The solution according to the invention involves electrically connecting, e.g. welding or clinching, a circuit board contact element 100 as a terminal 100 of the circuit board plug contact device 10 to a plug contact element 200 likewise as a terminal 200 of the circuit board plug contact device 10, and arranging these in a laterally offset manner in the circuit board plug contact device 10. Owing to this geometric arrangement between the circuit board contact element 100 and the plug contact element 200, two plug-connectable circuit board connections as the power-electric circuit board connection 2 can be flexibly arranged on the circuit board 1 and as a result the minimum creepage distance can be considerably increased (cf. the solid arrows in FIGS. 5 and 6).

The circuit board connection 2 comprises the circuit board 1 and at least two electrical circuit board plug contact devices 10 mounted on the circuit board 1. The circuit board plug contact devices 10 are mounted on the circuit board 1 in such a way that a minimum direct distance between the circuit board contact element 100 thereof on the circuit board 1 (creepage distance) is greater than a minimum direct distance between the plug contact element 200 thereof above the circuit board 1 (clearance distance). If at least one plug housing 300 is present, it is not included in the distances just mentioned.

On the circuit board 1, two interior spaces of the circuit board plug contact devices 10, which interior spaces are partially delimited by substantially l-shaped circuit board contact element 100, can face one another. The plug contact element 200 of the circuit board plug contact device 10 may be arranged in such an interior space. Furthermore, on the circuit board 1, a total interior space, which is partially delimited by two substantially l-shaped circuit board contact elements 100, can have a substantially rectangular footprint. In addition, on the circuit board 1, the plug contact element 200 can be arranged in the circuit board connection from mutually opposite sides of the circuit board connection.

The invention produces a mechanically plug-connectable circuit board connection 2 with an adaptable arrangement of the circuit board plug contact devices 10 thereof on a circuit board 1. The circuit board plug contact devices 10 can be used for different spacings and/or orientations of mating contact element. In particular, considerably larger creepage distances on the circuit board 1 itself and also larger clearance distances in comparison to the prior art are produced on account of the plug housing 300. A circuit board plug contact device 10 can, on account of the design thereof, readily absorb vibrations, in particular micro-vibrations (spring arm).

The circuit board plug contact device 10 is—apart from a possibly given multi-part structure of the circuit board contact element 100 and/or the plug contact element 200—of at least or precisely two-piece design, wherein these two "pieces", that is to say the circuit board plug contact device 100 and the plug contact element 200, are combined to form the circuit board plug contact device 10.

In the case of a connector 5 to be mounted on such a circuit board connection 2, the electrical mating contact element 20 thereof must not be bent, in order to maintain a creepage distance on the circuit board 1. As a result, smaller tolerances can be achieved and mounting of the connector 5 at/on an electrical entity 0 with the circuit board connection 2 according to the invention is considerably easier. Furthermore, the invention affords new design freedom and more flexibility.

The circuit board contact element 100 can be, in particular, in the form of a mechanical-electrical circuit board contact element. The plug contact element 200 can be, in particular, in the form of an electromechanical plug contact element. Here, 'mechanical-electrical' is intended to mean that the circuit board contact element 100 has a substantial mechanical functionality in addition to the important electrical functionality thereof. Also, here, 'electromechanical' is intended to mean that the plug contact element 200 has a mainly electrical functionality in addition to the important mechanical functionality thereof.

A longitudinal direction of the circuit board plug contact device 10 can be substantially parallel to the longitudinal extents of the circuit board contact element 100 and the plug contact element 200. In this case, the common longitudinal direction constituted in this way can be a plug-connection direction of the circuit board plug contact device 10 or the plug contact element 100 towards a mating contact element, and/or a plug-connection direction of the mating contact element towards the plug contact element or the circuit board plug contact device 10. In this case, the longitudinal direction can project substantially perpendicularly in particular from a flat extent of the circuit board 1.

The longitudinal extents of the circuit board contact element 100 and the plug contact element 200 may only partially overlap in the circuit board plug contact device 10. Here, the circuit board contact element 100 can project away from the circuit board plug contact device 10 further than the plug contact element 200 in a longitudinal direction Lr. Also, the plug contact element 200 can furthermore project away from the circuit board plug contact device 10 further than the circuit board contact element 100. A free longitudinal end portion of the plug contact element 10 can be electrically conductively provided on a central portion of the circuit board contact element 100.

In an embodiment, as shown in FIGS. 2 to 7, the circuit board contact element 100 is in the form of a busbar 100 and the plug contact element 200 is in the form of a socket contact element 200. It is of course possible to use other contact elements 100, 200. Reference is made to these terms below, but the terms circuit board contact element 100 instead of busbar 100 and plug contact element 200 instead of socket contact element 200 can always be implicitly understood, i.e. can be used.

The plug contact element 200 can be selected from a large number of contact systems (MCP, MCON, MQS etc.), i.e. can comprise a corresponding terminal on the mating contact side. The busbar 100 has multi-springs or solder pins as the circuit board-side terminals thereof. The busbar 100 can be of straight or angled design, in particular angled at approximately 90°. The material thicknesses of the busbar 100 can be selected depending on the application, e.g. to be smaller than, approximately or greater than: 0.4 mm; 0.5 mm; 0.6 mm; 0.8 mm; 1.0 mm; 1.2 mm; 1.4 mm; 1.5 mm etc.

The electrical or mechanical-electrical circuit board contact element 100 as the busbar 100 comprises, in its longitudinal direction Lr100 (in an embodiment parallel to the longitudinal direction Lr of the circuit board plug contact device 10) starting from sides of the circuit board 1, in an embodiment three functional portions 110, 120, 130: an electrical circuit board terminal 110 for electrically contacting the circuit board 1, an electrical plug contact element terminal 120 for electrically contacting the socket contact element 200 (by way of the contact element terminal 220 thereof), and a mechanical connection device 130 for an electrically insulating plug housing 300 of the circuit board plug contact device 10.

A busbar is understood to mean e.g. a conductor rail, a conductor strip, a conductor strut which can be e.g. further in the form of a (shaped) leadframe. Here, the busbar can be of straight or angled design. The busbar can have a large number of electrical circuit board individual terminals as the circuit board terminal 110. Here, the busbar can have in particular at least or precisely: two, three, four, five, six or more circuit board individual terminals. The busbar can have a substantially continuous electrical strip as the plug contact element terminal. In addition, the busbar can have precisely: one, two, three or more lugs as the connection device.

The electrical circuit board terminal 110 can be e.g. in the form of an active and/or an inactive circuit board terminal. At least one press-in pin or press-in bar (multi-spring, action pin, eye-of-the-needle etc.), a solder pin, an SMD leg, a (passage) cutout etc. can come into consideration here. The electrical plug contact element terminal 110 can have e.g. a contact shape, a contact area, a contact pad etc. Here, the plug contact element terminal can be formed in a complementary manner with respect to the contact element terminal of the plug contact element 200 in portions. In the present case (busbar 100), the electrical circuit board terminal 110 comprises a plurality of, in particular two, four or six, press-in pins or press-in bars, the electrical plug contact element terminal 120 comprises a substantially continuous electrical strip.

The electrical circuit board terminal 110 can have e.g. a lug, a pin, a recess etc., possibly with at least one latching device. In an embodiment, the connection device 130 comprises a plurality of, in particular one or two, mechanical lugs. Other designs of a relevant functional portion 110, 120, 130 of the busbar 100 are mentioned in the description of the invention.

In a plane spanned e.g. by the vertical direction Hr and the transverse direction Qr, the busbar 100 has an L-shaped profile with limbs of substantially equal length (Y-shaped profile with a 90° intermediate angle); the limbs can also be formed with different lengths and/or the busbar 100 can have a different profile, such as an I-shape or a U-shape. The busbar 100 may be formed in such a way that a half of the busbar 100 extending in the longitudinal direction Lr and transverse direction Qr can be symmetrically folded or rotated (rotational symmetry) onto another half of the busbar 100 likewise extending the longitudinal direction Lr and transverse direction Qr (see FIG. 3, in an embodiment 90° rotational symmetry).

The electrical or electromechanical plug contact element 200 as the socket contact element 200 has, in its longitudinal direction Lr200 (parallel to the longitudinal direction Lr of the circuit board plug contact device 10) starting from sides of the circuit board 1, three functional portions 220, 230, 240: an electrical contact element terminal 220 for electrically contacting the busbar 100 (by way of the plug contact element terminal 120 thereof), a mechanical-electrical transition portion 230, and a electrical mating contact terminal 240 for electrically contacting the mating contact element 20.

The electrical contact element terminal 220 can have e.g. a contact shape, a contact area, a contact pad etc. Here, the contact element terminal 220 can be formed in a complementary manner with respect to the plug contact element terminal 120 in portions. In the present case (socket contact element 200), the electrical contact element terminal 220 comprises an in particular bent-over electrical contact lug, the mechanical-electrical transition portion 230 comprises a spring arm for vibration damping, and the electrical mating contact terminal 240 comprises a socket. Other designs of a relevant functional portion 220, 230, 240 of the plug contact element 200 are mentioned in the description of the invention. The mechanical-electrical transition portion 230 can have e.g. a spring arm, a vibration damping arm, a rigid arm etc. For cushioning and/or damping purposes, a design of the transition portion 230 which is flexible compared to other portions of the circuit board plug contact device 200 can be used. The electrical mating contact terminal 240 can have e.g. a socket, a tab or a pin.

The plug contact element 200 can, by way of the contact element terminal 220 thereof, be provided on a single limb of the I-shaped busbar 100. Here, the contact element terminal 220 is provided on the plug contact element terminal 120 of the I-shaped busbar 100. The plug contact element 200 is arranged in an interior space of the circuit board plug contact device 10, which interior space is partially delimited by the I-shaped busbar 100. In particular, the plug contact element 200 projects from the limb of the I-shaped busbar 100 inwards into the interior space of the circuit board plug contact devices which is partially delimited by the I-shaped busbar 100.

Figure 3:
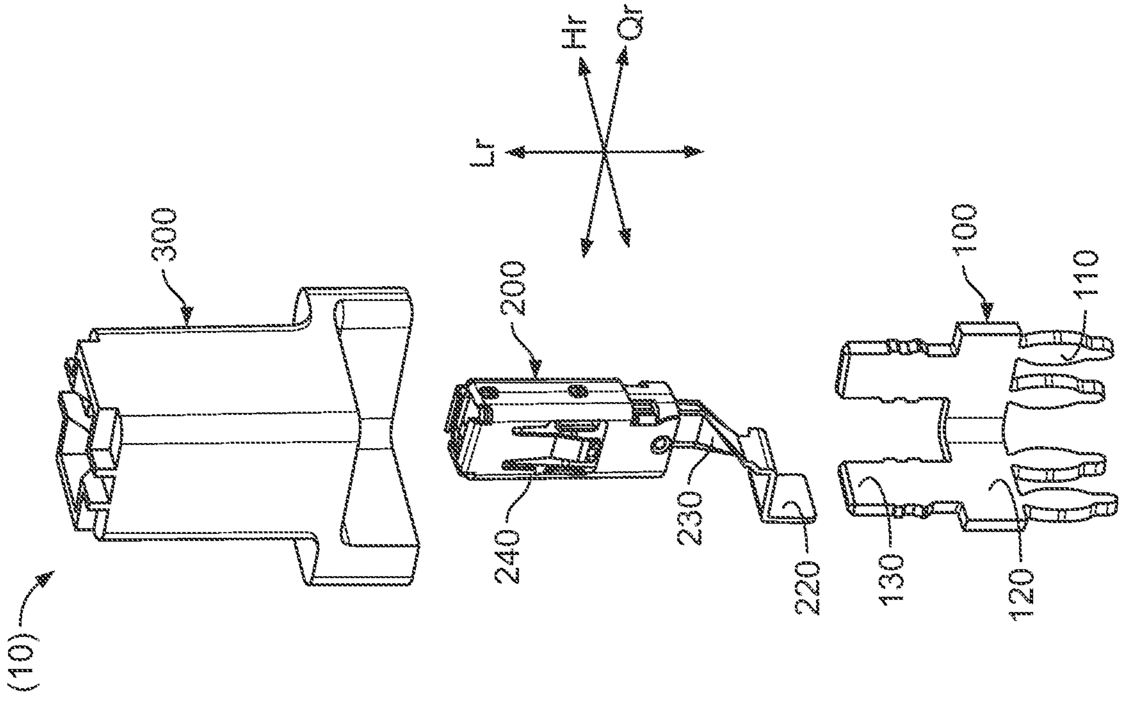
FIG. 3 is an exploded perspective view of the circuit board or substrate plug contact device.
Figure 5:
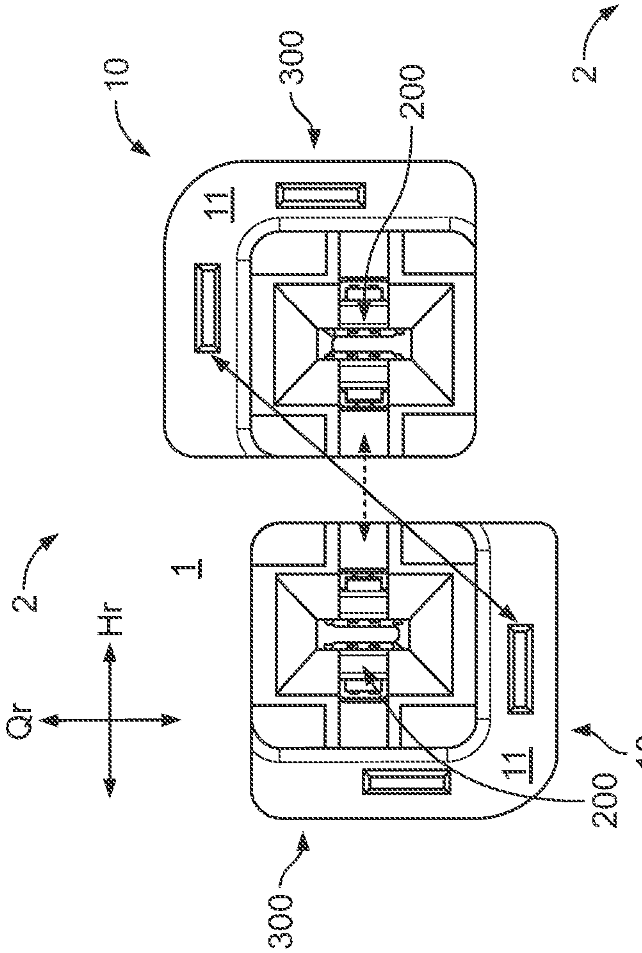
FIG. 5 is a plan view of a configuration of a power-electric connection according to the invention analogously to FIG. 3.
Figure 6:
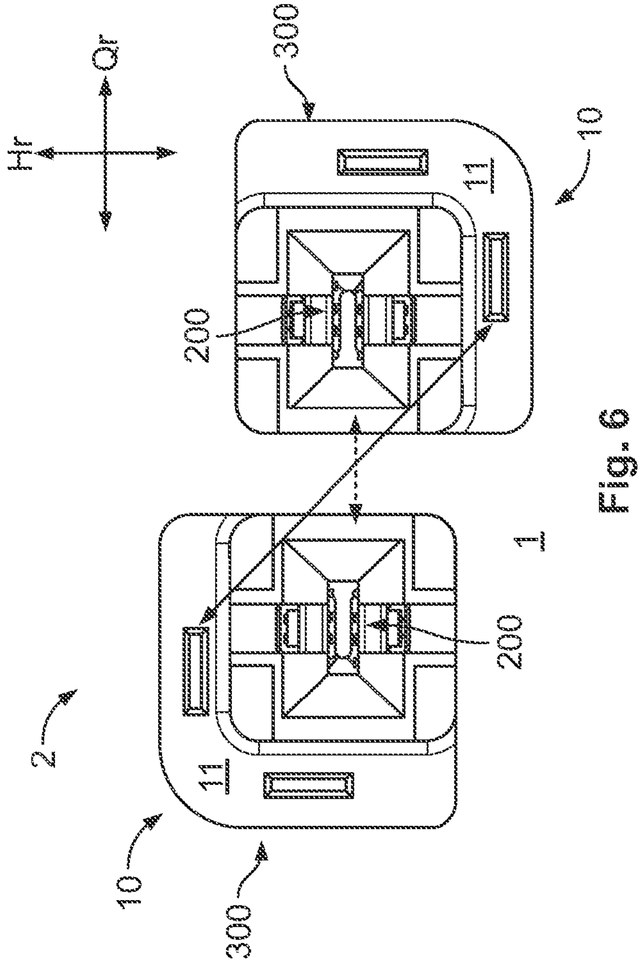
FIG. 6 is a plan view of another configuration of a power-electric connection according to the invention.
Figure 7:
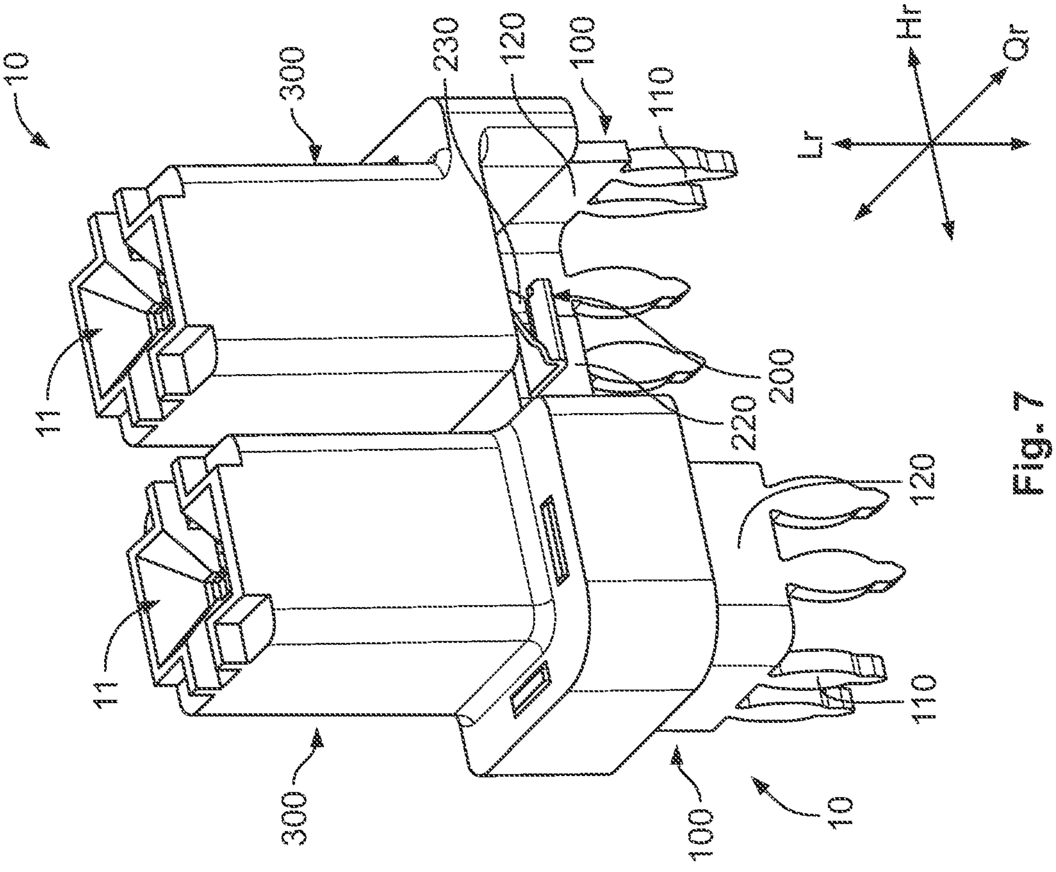
FIG. 7 is a perspective view of a power-electric connection according to the invention with two circuit board contact element analogously to FIG. 3, wherein the circuit board has been omitted.

In a plane spanned e.g. by the longitudinal direction Lr and the transverse direction Qr, the socket contact element 200 has an elongated, approximately z-shaped profile (cf. e.g. FIG. 3). In this case, a connecting web between the two free limbs of the z-shaped profile is formed by the spring arm for vibration damping, the comparatively short contact lug being arranged on one free limb (z-shaped profile) or longitudinal end portion thereof and the comparatively long socket in the socket contact element 200 being arranged on the other free limb (z-shaped profile) or longitudinal end portion thereof.

In this case, the longitudinal direction Lr100 of the busbar 100 may be constituted by the directions of main extent of the press-in pins or press-in bar thereof and the mechanical lugs thereof. In this case, the longitudinal direction Lr200 of the socket contact element 200 is constituted by a direction of main extent of the socket thereof. In the present case, the busbar 100 with its longitudinal direction Lr100 and the socket contact element 200 with its longitudinal direction Lr200 are arranged substantially parallel within the circuit board plug contact device 10 (cf. FIGS. 2 and 4). However, in other embodiments, an angle is possible here.

The busbar 100 and the socket contact element 200 are constituted as the circuit board plug contact device 10 in such a way that at one end the circuit board terminal 110 projects away further in one longitudinal direction Lr and at the other end the mating contact terminal 240 projects away further in the other longitudinal direction Lr than a central portion of the circuit board plug contact device 10 constituted jointly by the busbar 100 and the socket contact element 200.

The socket contact element 200 is, by way of the contact element terminal 220 thereof, electrically and mechanically fixedly provided on the plug contact element terminal of the busbar 100. In particular, the bent-over electrical contact lug is fastened to the electrical strip, it being possible for this to be done by welding, soldering or clinching (electrically conductive connection 12). Proceeding from here, the transition portion 230 or the spring arm for vibration damping extends away from a longitudinal extent of the busbar 100 at an angle different from 0° and 90° (cf. FIG. 2). In this case, the socket contact element 200 is formed in such a way that it, in the region of the mating contact terminal 240 thereof or the socket thereof, as described above, extends in particular parallel to the longitudinal direction Lr.

After the circuit board plug contact device 10 or a contact device 100, 200 (circuit board contact element 100/busbar 100 and plug contact element 200/socket contact element 200) or the circuit board contact element 100/busbar 100 of the circuit board plug contact device 10 have been mounted on the circuit board 1, the plug housing 300 can be provided on the circuit board plug contact device 10 or the contact device 100, 200 at least in portions. In an embodiment, the entire circuit board plug contact device 10 or the entire contact device 100, 200 is received in the plug housing 300.

The electrically insulating plug housing 300 can be plug-mounted or is plug-mounted onto the circuit board contact element 100 and the plug contact element 200. The plug housing 300 may be formed in such a way that the plug contact element 200 is accessible to an electrical mating contact element via a mating face of the circuit board plug contact device 10. The plug housing 300 can be formed in such a way that the plug housing 300 can be locked or is locked on the circuit board contact element 100. Furthermore, the plug contact element 200 can be locked or is locked in the plug housing 300. The plug housing 300 can have an insertion bevel for the mating contact element on/in the mating face.

The plug housing 300 locks on the at least one connection device 130 or lug of the busbar 100. In an embodiment, the socket contact element 200 to be firmly held on the inside in the plug housing 300, in particular locked on the inside in the plug housing 300. Here, a latching area, e.g. a latching shoulder, a latching spring etc., of the socket contact element 200 can come into contact with a latching area, e.g. a latching shoulder, a latching spring etc., in the plug housing 300.

The plug housing 300, in the state in which it is mounted on the circuit board plug contact device 10 or the contact device 100, 200, can be supported on the circuit board 1. For this purpose, the plug housing 300 can have a corresponding edge opposite its mating face 11, the edge being arranged parallel to a surface of the circuit board 1. This edge can be arranged in a partially encircling (cf. FIGS. 3 and 7) or substantially fully encircling manner on a lower longitudinal end of the plug housing 300. The mating face 11 has an insertion bevel for the mating contact element 20.

A chamfer on the plug housing 300 allows larger tolerances to be handled by the mating contact element 20. Users of the circuit board plug contact device 10 can mount a pin strip (header) of a proven and known contact system after an pre-installed circuit board. The circuit board contact element 100 in the form of a busbar (conductor rail, conductor strip, conductor strut, leadframe) with the circuit board terminal thereof or the circuit board individual terminals thereof can be easily produced from a pre-embossed strip. The plug contact element 200 can be electromechanically connected to the circuit board plug contact device 10 in different ways (welding, soldering, adhesive bonding, clinching, pinching etc.).

Figure 4:
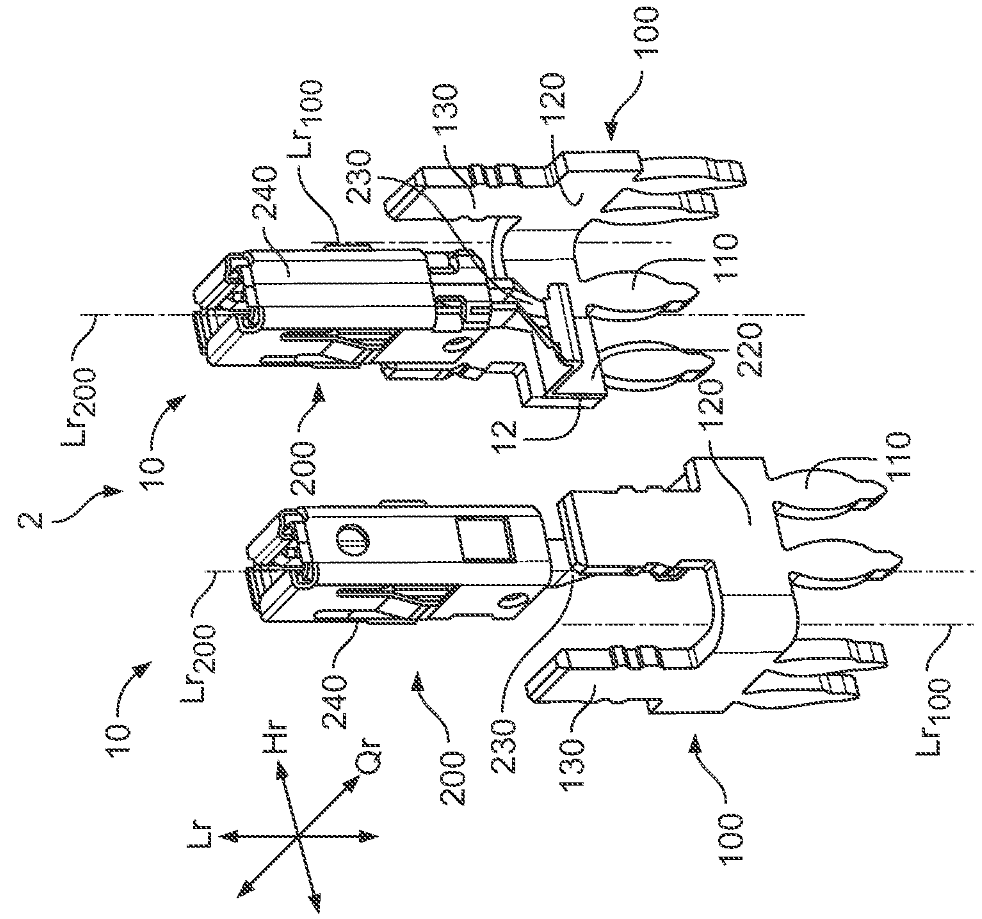
FIG. 4 is a perspective view of two circuit board plug contact devices according to the invention analogously to FIG. 2 for a power-electric connection on a circuit board of an electrical entity.

The longitudinal directions Lr100, Lr200 of the circuit board contact element 100 and the plug contact element 200 can be arranged substantially parallel, as shown in FIG. 4, or angled in the circuit board plug contact device 10. This may also only apply to functional portions 110, 120, 130; 220, 230, 240, in particular the functional portions 120, 130; 240 or in particular only the functional portions 130; 240, with the respectively other functional portions 110; 220, 230 110, 120; 220, 230 being disregarded in such a consideration.

Here, the mating contact terminal 240 can be arranged in the circuit board plug contact device 10 in such a way that it can be electromechanically contacted by the mating contact element 20 in a direction arriving directly from above the printed circuit board 1 (cf. FIG. 2). For this purpose, at least the longitudinal directions Lr100, Lr200 of the functional portions 130; 240 are arranged substantially parallel in the circuit board plug contact device 10.

Furthermore, the mating contact terminal 240 can be arranged in the circuit board plug contact device 10 in such a way that it can be electromechanically contacted by the mating contact element 20 in a direction not arriving from above, but rather at an angle with respect to the circuit board 1. For this purpose, at least the longitudinal directions Lr100, Lr200 of the functional portions 130; 240 are arranged substantially at an angle in the circuit board plug contact device 10. Here, applicable angles are somewhat above 0° (0°: parallel longitudinal directions Lr100, Lr200) up to somewhat below 90°; in an embodiment, angles between the longitudinal directions Lr100, Lr200 are e.g.: 15°, 30°, 45°, 60° or 75°.

The circuit board plug contact device 10 can, in accordance with LV 214, meet the vibration requirements of class or in accordance with degree of severity: 1, 2, 3 and/or 4. In particular, the vibration requirement of class or in accordance with degree of severity 2 or 3 is met by the circuit board plug contact device 10. Furthermore, it may be possible for the circuit board plug contact device 10, in accordance with LV 214, to not meet the requirements of class or in accordance with degree of severity: 4 and/or higher.

The circuit board plug contact device 10 can be designed for electrical voltages of at least approximately: 60 V, 100 V, 150 V, 250 V, 500 V, 800 V, 1 kV, 1.25 kV or 1.5 kV, and/or electrical currents of at least approximately: 10 A, 20 A, 30 A, 45 A, 60 A, 75 A, 100 A, 125 A, 150 A, 200 A, 250 A, 300 A or 400 A. It is of course possible to design the circuit board plug contact device 10 for voltages of below 250 V and/or currents of below 10 A. The circuit board plug contact device 10 is designed for a use temperature of approximately −40° C. to approximately: 120° C., 140° C., 150° C., 160° C., 170° C., 180° C., 190° C. or 200° C.

The circuit board contact element 100, the plug contact element 200 and/or the plug housing 300 can be integrally formed. An integral design is understood to mean a design of the contact element of the plug housing 300 in which there is only one single component part, which can be separated only by being destroyed. The component part (piece) is manufactured from a single original piece (metal sheet, blank etc.) and/or from a single original mass (molten metal, molten plastic), which for its part is necessarily an integral part. An inner bond is made by adhesion and/or cohesion. Here, it is additionally possible to provide coating, deposition, galvanization etc. (circuit board contact element, plug contact element).

A contact device 10 comprising the circuit board contact element 100 and the plug contact element 200 can be formed materially in one piece or inseparably in one piece. A materially (adhesively) one-piece design is understood to mean a design of the contact device (component part comprising circuit board contact element and plug contact element) in which the individual parts thereof are secured to one another substance-to-substance (welded, soldered, adhesively bonded etc.) and it, that is to say the contact device 10, cannot be separated into its individual parts thereof without damage. In this case, the bond can further be produced by a non-positively and/or positively locking connection (not in the case of an integral design).

An inseparable one-piece design is understood to mean a design of the contact device 10 (component part (piece) comprising circuit board contact element and plug contact element) in which the individual parts thereof are secured to one another with non-positive and/or positive locking and it, that is to say the contact device 10, cannot be separated into the individual parts thereof again without damage. (In the case of a multi-part design, a non-positively and/or positively locking connection would (necessarily) be absent or a bond is established by a third part in this case).

A mounted circuit board plug contact device comprising the contact device 10 (circuit board contact element 100 and plug contact element 200) thereof and the plug housing 300 thereof can be formed separably in one piece. A separable one-piece design is understood to mean a design of the circuit board plug contact device 10 (contact device (component part comprising circuit board contact element 100 and plug contact element 200) on the one hand and plug housing 300 as component part on the other hand) in which it can be separated manually or by a tool and without damage to the two component parts (contact device and plug housing) thereof. The circuit board plug contact device 100 may be bonded by a non-positively and/or positively locking connection.

The electrical entity 0 comprises an electrical circuit board 1 and an electrical circuit board plug contact device 10 thereon as a connector device, or an electrical device and a power-electric circuit board connection 2, wherein the circuit board plug contact device 10 or the circuit board connection 2 is formed according to the invention. Here, the circuit board 1 can also be called or be in the form of a substrate. Such an entity can be e.g. in the form of an electrical assembly, an electrical component, an electrical module, an electrical unit, an electrical instrument, an electrical appliance, an electrical installation, an electrical system etc.

What is claimed is:

1. An electrical circuit board plug contact device, comprising:

an electrical circuit board contact element; and an electrical plug contact element formed separately from the electrical circuit board contact element, the electrical plug contact element is laterally offset with respect to the electrical circuit board contact element and an electrically conductive connection is provided between the electrical circuit board contact element and the electrical plug contact element, the electrical plug contact element includes an electrical contact element terminal having a bent-over electrical lug, a mechanical-electrical transition portion extending from the electrical contact element terminal and having a mechanical-electrical spring, and an electrical mating contact terminal.

2. The electrical circuit board plug contact device of claim 1, wherein a longitudinal direction of the electrical circuit board contact element and a longitudinal direction of the electrical plug contact element are parallel or at an angle to one another.

3. The electrical circuit board plug contact device of claim 1, wherein a free longitudinal end portion of the electrical plug contact element is electrically conductively provided on a central portion of the electrical circuit board contact element.

4. The electrical circuit board plug contact device of claim 1, wherein the electrical circuit board contact element and the electrical plug contact element are secured materially in one piece or inseparably in one piece.

5. The electrical circuit board plug contact device of claim 1, wherein a longitudinal direction of the electrical circuit board plug contact device is parallel to a longitudinal direction of the electrical circuit board contact element and a longitudinal direction of the electrical plug contact element.

6. The electrical circuit board plug contact device of claim 5, wherein the longitudinal direction of the electrical circuit board contact element and the longitudinal direction of the electrical plug contact element only partially overlap.

7. The electrical circuit board plug contact device of claim 1, further comprising a plug housing mounted on the electrical circuit board contact element and the electrical plug contact element.

8. The electrical circuit board plug contact device of claim 7, wherein the plug housing is locked on the electrical circuit board contact element and the electrical plug contact element is locked in the plug housing, the plug housing is supported on a circuit board.

9. The electrical circuit board plug contact device of claim 7, wherein the electrical circuit board contact element has an electrical circuit board terminal, an electrical plug contact element terminal for the electrical plug contact element, and a mechanical connection device for the plug housing.

10. The electrical circuit board plug contact device of claim 9, wherein the electrical circuit board contact element is a busbar.

11. The electrical circuit board plug contact device of claim 10, wherein the electrical circuit board terminal has a plurality of electrical circuit board individual terminals, the electrical plug contact element terminal has a substantially continuous electrical strip, and the mechanical connection device has at least one mechanical lug.

12. The electrical circuit board plug contact device of claim 1, wherein the electrical plug contact element is a socket contact element.

13. The electrical circuit board plug contact device of claim 12, wherein the electrical mating contact terminal has an electrical socket.

14. The electrical circuit board plug contact device of claim 1, wherein the electrical circuit board contact element has an I-shape, an L-shape, or a U-shape and the electrical plug contact element has a Z-shape or an L-shape.

15. The electrical circuit board plug contact device of claim 14, wherein the electrical plug contact element is disposed on a single leg of the electrical circuit board contact element and projects from the leg into an interior space of the electrical circuit board plug contact device that is partially delimited by the electrical circuit board contact element.

16. A circuit board connection, comprising:

a circuit board; and a plurality of electrical circuit board plug contact devices each mounted on the circuit board, the electrical circuit board plug contact devices each include an electrical circuit board contact element and an electrical plug contact element formed separately from the electrical circuit board contact element, the electrical plug contact element is laterally offset with respect to the electrical circuit board contact element and an electrically conductive connection is provided between the electrical circuit board contact element and the electrical plug contact element, a minimum direct distance between the electrical circuit board contact elements is greater than a minimum direct distance between the electrical plug contact elements and the circuit board.

17. An electrical entity, comprising:

a circuit board connection according to claim 16.

18. The circuit board connection of claim 16, wherein, on the circuit board, a pair of interior spaces of the electrical circuit board plug contact devices that are delimited by the electrical circuit board contact elements face one another.

19. The circuit board connection of claim 18, wherein the electrical plug contact elements are arranged on mutually opposite sides of the circuit board.

20. An electrical circuit board plug contact device, comprising:

an electrical circuit board contact element; and an electrical plug contact element formed separately from the electrical circuit board contact element, the electrical plug contact element is laterally offset with respect to the electrical circuit board contact element and an electrically conductive connection is provided between the electrical circuit board contact element and the electrical plug contact element, the electrical plug contact element is disposed on a single leg of the electrical circuit board contact element and projects from the leg into an interior space of the electrical circuit board plug contact device that is partially delimited by the electrical circuit board contact element.

* * * * *